Sept. 11, 1951  A. E. McKEE ET AL  2,567,224
OXYGEN ADMINISTRATION SYSTEM
Filed Aug. 17, 1943  3 Sheets-Sheet 1

INVENTORS
Albert E. McKee
James D. Elsom
By McLaughlin & Wallenstein
Attys

Sept. 11, 1951  A. E. McKEE ET AL  2,567,224
OXYGEN ADMINISTRATION SYSTEM
Filed Aug. 17, 1943  3 Sheets-Sheet 3

Inventors
Albert E. McKee
James D. Elsom
By: McLaughlin & Wallenstein Attys.

Patented Sept. 11, 1951

2,567,224

UNITED STATES PATENT OFFICE 2,567,224

OXYGEN ADMINISTRATION SYSTEM

Albert E. McKee, Chicago, and James D. Elsom, Evanston, Ill.; said Elsom assignor to said McKee Application August 17, 1943, Serial No. 498,973

14 Claims. (Cl. 128—142)

Our invention relates to oxygen administering systems and apparatus for use therewith.

Oxygen is administered under a variety of conditions to secure various types of results and in various ways, depending upon the conditions found and the results desired. The copending application of Albert E. McKee, Serial No. 537,803, filed May 29, 1944, discloses improved oxygen administering equipment and in certain respects, at least, our present invention is an improvement over the invention disclosed in the said copending McKee application. The McKee invention was adapted for use by aircraft personnel, at high altitudes, but had other uses and the system and apparatus of our invention, while still having at least the utility of the McKee apparatus, has added features and advantages, particularly so far as aircraft personnel and the like are concerned.

There are very definite disadvantages which have been found to exist in oxygen equipment, one of the principal of which is that no equipment with which we are familiar has been sufficiently versatile in the uses to which it can be put to satisfy usual demands caused by varying conditions. For a given purpose even, much of the equipment used has proven unsatisfactory. In order that those skilled in the art may understand more fully the features and objects of our invention, we wish to point out briefly the nature of some of the problems involved.

Generally speaking, it is undesirable to deliver oxygen to aircraft personnel below about 10,000 feet. From 10,000 to approximately 38,000 feet, a mixture of oxygen and air or pure oxygen may be delivered substantially at ambient pressure. Above approximately 38,000 feet, it is necessary to supply 100% pure oxygen at some positive pressure on inspiration to avoid anoxia. Generally speaking, it is desirable, if not necessary, that an oxygen administering system include provisions for delivering ordinary air to the aircraft personnel at lower levels with the oxygen mask in position on the face. Oxygen or a mixture of air and oxygen at the inspirational demand of the subject at ambient pressure or substantially at ambient pressure (mere flow of oxygen bearing atmosphere) and at a controlled positive pressure above ambient pressure, also on inspirational demand of the subject, since the transporting of oxygen to and on the airplane is a matter of considerable expense, economy of administration and utilization of oxygen is essential. Any system which makes use of continuous flow of oxygen is, therefore, undesirable. Demand regulators which require negative pressure throughout the inspirational cycle have certain disadvantages and any pressure system which requires expiration against a positive pressure is also undesirable.

Under certain conditions, even in aircraft (such as if the subject should become unconscious and incapable of exercising positive inspiration function), it may be necessary to operate oxygen administering equipment in accordance with a rhythmic cycle automatically and without the necessity of the subject making any demand as by inspiration. It is also desirable to avoid, so far as possible, any substantial rebreathing such as might lead to the freezing of control or regulating equipment and there are certain very definite advantages in the provision of a separate expiratory valve so that there is no occasion to exhale through the entire mechanism. Some rebreathing or provision of other means for assuring the presence of adequate proportions of carbon dioxide to stabilize inspiration at a normal rate is, of course, desirable.

The object of our invention is the provision of an improved oxygen administration system, particularly one which secures the advantages and overcomes the problems identified hereinabove. Another object is the provision of oxygen administration apparatus adapted for use under a variety of conditions and for a variety of purposes but having particular utility in meeting the many demands of oxygen apparatus for aircraft personnel at medium and very high altitudes.

In accordance with our invention, oxygen is delivered to the subject on his demand on inspiration but with a positive flow after the first slight inspiratory effort. Thus the subject is not required to inhale against a negative pressure during the entire inspiratory cycle. Operated at intermediate altitudes at which a mixture of oxygen and air or pure oxygen is breathed and can be utilized by the subject readily at ambient pressure, there is a mere flow of oxygen on demand with only sufficient pressure to cause a continued flow. Means is provided, however, for increasing the pressure so that the equipment operates on demand with a positive pressure. Whether operating at the demand of the subject at substantially ambient pressures or above, the cycle reverses at a peak pressure in the administration line which may be very slightly, say one-half inch, above ambient pressure, to a predetermined value, say eight inches, or more above ambient pressure, depending upon design. The control of this pressure is mechanical and may be made by the subject at any time and the attainment of the peak pressure at which the cycle reverses is subject very greatly to the attitude of the subject so that a substantially normal breathing cycle may be maintained and the apparatus may be automatically compensated to a considerable extent for the oxygen demands of different subjects. Means may be provided, however, for adjusting the supply to the demands of a particular subject.

The apparatus is also operable on an automatic principle without demand of the subject, that is to say, without the necessity of the development of a negative pressure in the administration line caused by inspiratory action of the subject. Breathing under this adjustment may be made rhythmic and automatic, pressure in the line having the effect of filling the lungs and the muscle tonus will cause exhalation on reduction of pressure in the line caused by the automatic opening of an expiratory valve when a predetermined peak pressure is attained.

In addition to the fact that we provide versatile apparatus for meeting any usual demands for oxygen administration whether on demand at ambient pressures or on demand at pressures above ambient pressures or automatically, independently of demand, at any pressure within the limits of the design, we also provide additional features of a novel and valuable character. We provide valve means for controlling the flow of oxygen from a pressure source to the administration line which may be adjusted to operate at only a fraction of an inch of pressure so that very little effort is required on inspiration to cause a flow of oxygen to the subject. This valve means includes a toggle switch operated by a diaphragm, operating a relatively small valve which operates in the nature of a relay to provide pressure and operating a larger valve through which flow of oxygen is actually controlled. We also provide a separate expiratory valve which may be mounted directly in the line and fastened, for example, to the clothing of the subject so that it may readily be maintained at a sufficiently high temperature so that freezing is avoided. The expiratory valve is provided with means for adjusting the expiratory orifice so that the rate of discharge through the expiratory valve, and, therefore, the mean pressure, through the expiratory cycle, may be controlled. The apparatus is so constructed and arranged that the principal portion of the apparatus adapted for direct attachment to a source of oxygen may be maintained at a convenient place in an airplane or the like and connected to the separate expiratory valve by suitable flexible tubing. Any type of close fitting closed mask, including any mask especially fitted to a particular subject, may then be used and readily connected between the flexible tubing attached to the mask and the expiratory valve.

Other objects and features of the invention may be apparent from a consideration of the following detailed description taken with the accompanying drawings showing one embodiment of the invention.

In such drawings—

Figure 1:
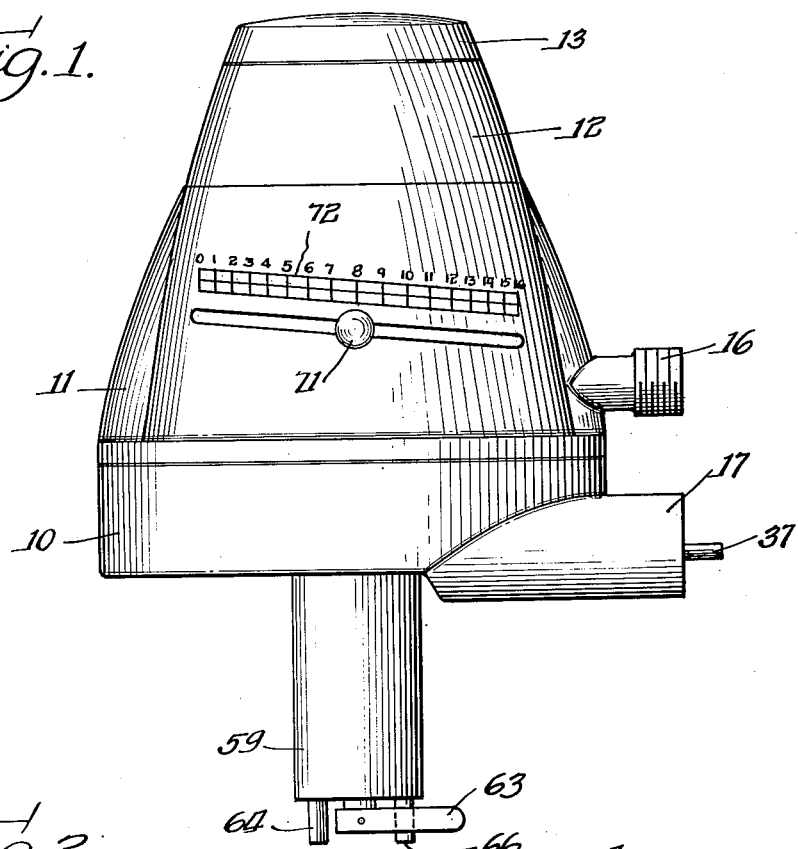
Fig. 1 is an elevational view of control apparatus other than the expiratory valve, mask and flexible tubing, adapted for attachment to a suitable mounting bracket or the like, which control apparatus, for convenience, is referred to hereinafter as the regulator.
Figure 2:
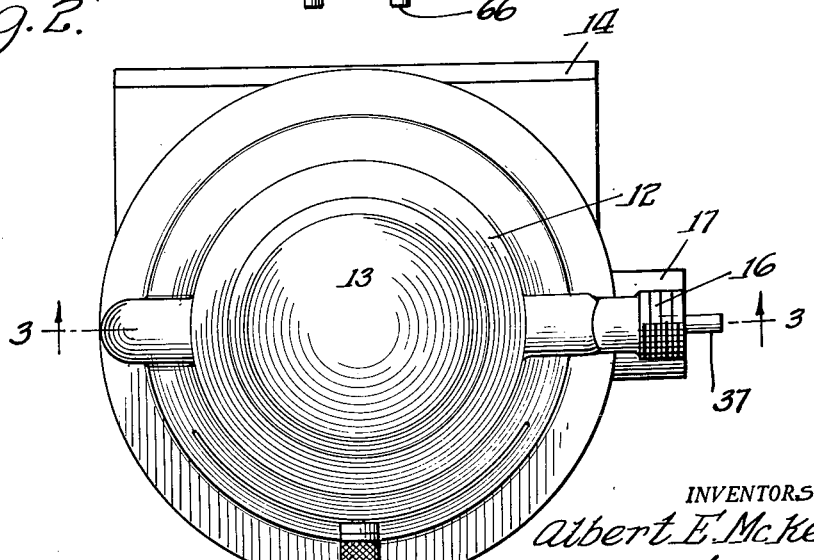
Fig. 2 is a plan view of the regulator shown in Fig. 1.

As utilized, the embodiment of our invention shown in the drawings, comprises a regulator indicated generally by the reference character A, an expiratory valve indicated generally by the reference character B, and a suitable close fitting closed mask indicated by the reference character C. The mask is connected to the regulator by flexible tubing of suitable cross section comprising an oxygen administration line and the expiratory valve is set in this line at a suitable point so that the exhaled breath passes through the oxygen administration line only as far as the expiratory valve, which, by its nature, is readily protected against extremes of temperature, and there is never any moisture from the breath which will reach the regulator mechanism.

The regulator is relatively light in weight and suitably formed to comprise, as shown, four main frame parts, 10, 11, 12 and 13, adapted to be suitably secured together by machine screws or the like which have not been shown in the drawings, the purpose being to avoid obscuring essential features of the apparatus. The frame part 10 is provided with a suitable flange 14 for attachment to a mounting bracket or the like. A boss 16 is provided on the frame part 11 for the attachment of a pipe connected to a suitable source of oxygen, valve controlled in the usual way common to oxygen therapy and auxiliary oxygen administration practice. A suitable outlet 17 is provided on the frame part 10 for attachment to flexible tubing comprising the oxygen administration line.

Figure 3:
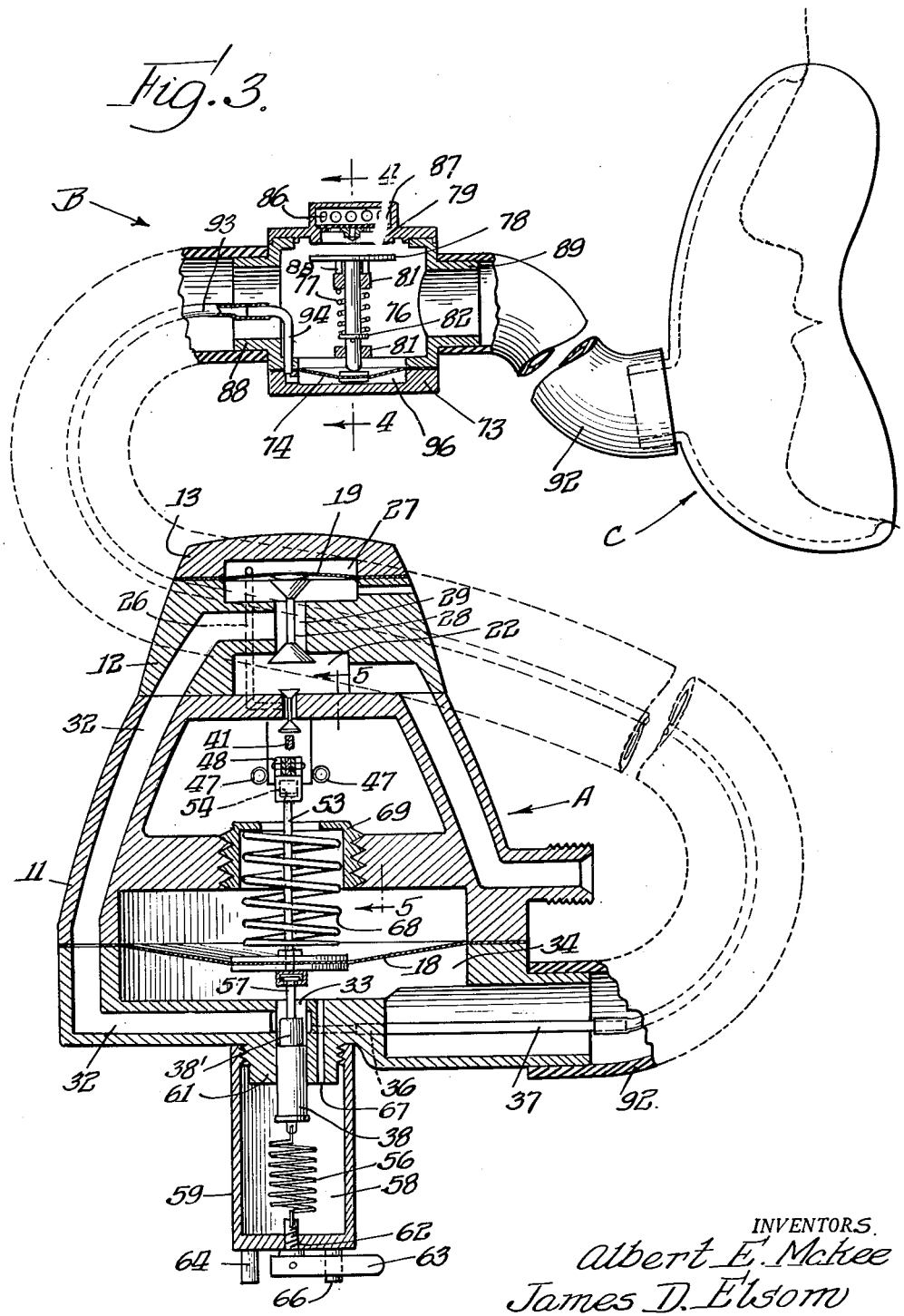
Fig. 3 is a composite view showing the regulator in section (taken along the line 3—3 of Fig. 2), the expiratory valve in section, the mask schematically in its proper position, and with connecting tubing broken away, the parts being connected together in the manner in which they are used during operation.
Figure 6:
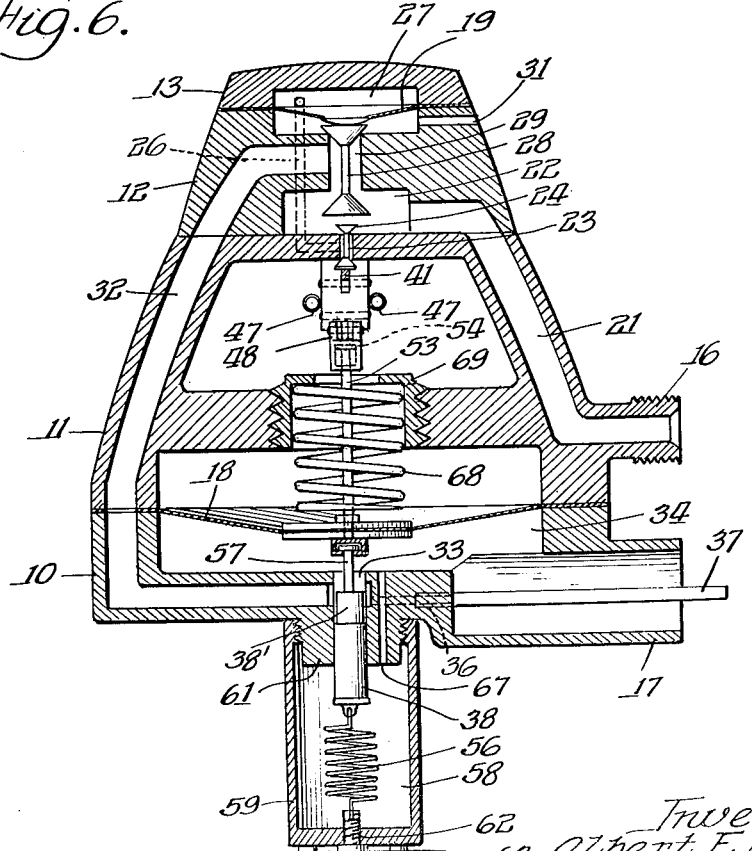
Fig. 6 is a sectional view similar to the section of the regulator shown in Fig. 3 but showing the valves in open position.

Referring now, also, to Figs. 3 and 6, a regulating diaphragm 18 is secured between the frame parts 10 and 11 and a booster diaphragm 19 between the frame parts 12 and 13. A passageway 21 leads from the oxygen supply source at the boss 16 to a chamber 22 which, therefore, is at all times filled with oxygen under substantially the pressure of the incoming line and the passageway 21. A vertical passageway 23 leads from the pressure chamber 22 to atmosphere, but this vertical passageway 23 is adapted to be closed at either end by a double ended valve 24. Another relatively small passageway 26, shown in dotted lines, leads to a chamber 27 in the frame part 13 but having as one side thereof the diaphragm 19. Diaphragm 19 is connected with a double ended valve 28 disposed in a larger vertical passageway 29 which passageway interconnects pressure chamber 22 and a chamber below the booster diaphragm 19 open to atmospheric pressure through a bleeder line 31. The valve 28 is adapted to close either end of passageway 29 so as to place pressure chamber 22 in communication with an oxygen delivery passageway 32 (in the position shown in Fig. 6), or to interrupt delivery of oxygen to the delivery passageway 32 and open such delivery passageway to atmosphere through the bleeder 31. The delivery passageway 32 communicates with a vertical port 33 leading to a diaphragm chamber 34 which is also in communication with the outlet 17 and hence, in a manner to be described, delivers oxygen to a subject. A small passageway 36 also communicates with the passageway 32 and with a relatively small line 37 in the nature of a tube, the purpose of which will be described later.

The flow of oxygen to the delivery passageway 32 and thence to the delivery line through the outlet 17 is controlled by the valves 23 and 28 although a plunger 38, which will be described later, has a bearing upon the rate of flow. The valves 23 and 28 are adapted to seat at contiguous portions of the frame members which comprise valve seats. While these valves may be permitted to remain loosely in position and will be returned after actuation through air pressure, it will be understood that actually positioning bearings are provided but not shown in the drawings because to do so would merely mask the essential features which it is the purpose of this specification to describe. The valve 23 is operated by a toggle or overthrow type switch mechanism, to be described, to control the delivery of oxygen under pressure to chamber 27 and the valve 28 is operated by movement of the diaphragm 19 due to oxygen pressure to the position shown in Fig. 6.

Figure 5:
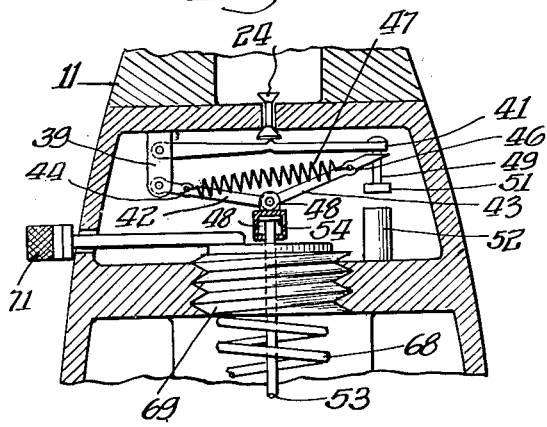
Fig. 5 is a fragmentary sectional view taken on the line 5—5 of Fig. 3 looking in the direction of the arrows.

The toggle or over-center type of switch mechanism is shown in two positions in Figs. 3 and 6 and also in elevation in Fig. 5. This includes a supporting bracket 39 depending from frame part 11 to which are pivoted a valve control arm 41 and one arm 42 of a compound lever mechanism to the opposite end of which a second arm 43 of the lever mechanism is pivoted. Arms 42 and 43 carry cross pins 44 and 46, respectively, to the extremes of which are attached ends of a pair of tension springs 47. The arms 42 and 43, at the point of pivot to each other, are also pivoted to a switch actuating member 48. Valve control arm 41 carries a pin or machine screw 49 which is placed between end bifurcations of the switch arm 43. The springs 47, arms 42 and 43, and switch actuating member 48 together comprise an over-center type of mechanism such that the springs 47 may snap to one side or the other of the pivot point between the arms 42 and 43. The bifurcation at the end of arm 43 may, therefore, either engage against the bottom of the valve control arm 41 to push it upwardly and operate the valve 24 to place the pressure chamber 22 in communication with the vertical passageway 23 or engage against the top portion of an adjustable nut 51 carried on the pin 49 and permit return of the valve 24 whereby to seal off the chamber 22 and open the chamber 27 to atmosphere. The uppermost position of the switch mechanism is determined by the valve 24 and the lowermost position is determined by a stop 52 which pin 49 is adapted to engage.

A switch actuating rod 53 is suitably carried by diaphragm 18, as shown, and has a head 54 disposed within the switch actuating member 48 preferably so as to have some lost motion with respect thereto. Movement of the rod upwardly past the point where the fulcrum between the arms 42 and 43 is in line with the point of support of the springs 47 causes the valve 24 to be closed and shut off the supply of oxygen.

The plunger 38 controls the flow of oxygen into the chamber 34, as already referred to, and it also forms a link between a spring 56 and a rod 57 connected to the lower portion of diaphragm 18 and comprising essentially a continuation of rod 53. Spring 56 is housed in a chamber 58, formed by a housing 59 threaded to a boss 61 on the frame part 10, concentric with the port 33. The upper end of spring 56 is secured to the bottom of plunger 38 and the lower end is secured to a screw 62 threaded in the housing 59 in alignment with the plunger 38. The screw 62 has secured thereto, exteriorly of the housing 59, an arm 63 adapted to be thrown to either of two positions adjacent stops 64 and 66. An aperture 67 is provided to equalize the pressure at opposite ends of plunger 38. The upper portion 38' of the plunger 38 is restricted and the nature and purpose of this restriction will be described later. In order to control the peak pressure at which oxygen demanded by the subject discontinues flowing and the expiratory valve, to be described later, is opened, we provide a peak pressure control spring 68 carried by a pressure control member 69 trheaded in a portion of the frame part 11. As shown particularly in Fig. 5, the threads have a very long lead or the pitch is great such as, for example, two threads to the linear inch. The lower part of the spring is never in contact with the diaphragm at rest position, that is to say, in the position which the diaphragm has in Fig. 6, but is adapted to be engaged by the diaphragm as the diaphragm moves upwardly when the device is operated on the demand principle, to be described. The pressure control member has secured thereto a pressure control arm 71, leading out to a scale 72 calibrated in any suitable wanner such as pounds per square inch pressure, altitude, inches of pressure above ambient pressure, or the like. As the pressure control arm is moved from one position to another, the lower portion of the spring is moved closer to or further away from the top of the diaphragm. At its maximum position of removal, the diaphragm will not contact it and the supply of oxygen may be discontinued in a manner to be described, without influence at all from the spring 68. If the spring 68 is in such position that the diaphragm will engage it before the switch mechanism is actuated to shut off the flow of oxygen, then the pressure in the chamber 34 at which oxygen ceases to be delivered is determined by the degree to which spring 68 must be compressed before operating the switch mechanism.

Figure 4:
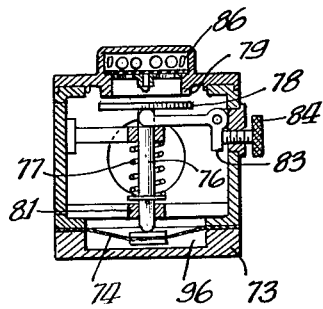
Fig. 4 is a transverse sectional view of the expiratory valve taken on the line 4—4 of Fig. 3.

The expiratory valve shown in two sections at right angles to each other in Figs. 3 and 4, includes a housing 73 containing a diaphragm 74 and a plunger 76 urged by a spring 77 in a direction to move a valve 78 away from its seat 79. The plunger 76 is vertically reciprocable in guides 81 connected to the housing 73 and the top end of spring 77 engages against one of these guides and the bottom against a stop 82 in the nature of a flange so that normally to urge the valve 78 away from its seat 79. The extent to which the spring may urge the valve away from its seat is determined by the position of a bell crank lever 83, the position of which may be adjusted by a screw 84. Thus the screw 84 may be employed to adjust the size of the expiratory orifice, thus determining the resistance to exhalation. Resistance to exhalation may be determined in part, also, by fixed openings 86 in a cap provided on the expiratory valve. A flutter valve 87 is provided between the valve seat 79 and the openings 86, this valve being very light in weight and so arranged that on exhalation it can readily be lifted from its seat but on inhalation it, as readily, is drawn to its seat so that on inspiratory demand of the subject a slight negative pressure may be created in the oxygen delivery line so as to operate a diaphragm and valve mechanism.

The expiratory valve is provided with suitable nipples 88 and 89 for receiving flexible tubing 91 and 92, the former extending to the regulator A and the latter to the face mask C. Within the flexible tubing 91 is a relaitvely small tube 93 connected to the small line 37, previously described, and to a tube 94 carried by the expiratory valve and connected to a diaphragm chamber 96 for actuation of the diaphragm. While the tubes 91 and 92 may readily be disconnected from the equipment with which they normally connect the tube 91 will normally remain connected to the expiratory valve and regulator and one end of tube 92 will normally be left connected to the mask C which may be the individual mask of the subject or user of the equipment. Preferably, also, the expiratory valve B is so arranged as to be carried on, near or in the clothing of a subject when the device is used in aircraft and the subject will normally take his position in the aircraft, attach the expiratory valve to his clothing by suitable means such as a clip (not shown), and, when there is a demand for oxygen, attach the tube 92 and set the equipment in operation.

As previously pointed out, the device is capable of operating in several different ways, depending upon requirements. We shall assume first that the springs 68 is moved to its uppermost position, that is to say, that the arm 71 is set over to zero or ambient pressure. Assume, further, that spring 56 is adjusted to a position where it cannot, alone, return the switch mechanism to the position where valve 24 will close the opening to passageway 23. The operation can be understood from the fact that the parts in Fig. 6 are in the position which they assume when the subject has just started inspiration and he has tripped the valve mechanism and oxygen has just started to flow into the delivery passageway 32. It is to be understood, also, that the parts of the regulator in Fig. 3 are in the position which they occupy just before initial inspiration.

It is to be understood, however, that the spring 68 is assumed in our hypothetical case to be at its uppermost position so that pressure will not build up in the chamber 34 to a point above or substantially above ambient pressure.

Under the conditions pointed out, let us assume that an aviator it at 25,000 or 30,000 feet and has his mask in position, he is breathing pure oxygen from a suitable pressure tank and through a connection leading to boss 16 and incoming passageway 21. He has finished exhaling and the parts are in the position shown in Fig. 3 and now starts to inhale. The flutter valve 87 has fluttered to its seat and his action in starting to breathe causes a slight negative pressure in the delivery line and thereby a slight downward pull on diaphragm 18. This trips over the switch mechanism and the parts are now in the position shown in Fig. 6. This occurs because of the movement of the valves and the action of the booster diaphragm 19, previously referred to. Oxygen is delivered to passageway 32 under pressure, say of eight pounds per square inch, and there is an immediate surge of oxygen into the chamber 34 to be made immediately available to the subject, this surge occurring because, due to the fact that the port 33 is substantially entirely open except for the rod 57, there is a maximum orifice to permit maximum movement of the oxygen into the chamber 34. As soon as this occurs, there is a slight upward movement of the diaphragm with the result that the restricted portion 38' of the plunger occupies that portion of the port 33 through which the oxygen must pass and thereafter there is a steady demanded flow of oxygen. As long as the subject continues to inhale, oxygen continues to flow but as soon as he has discontinued inhalation, there is a slight momentary rise of pressure in chamber 34 which thereby trips the switch mechanism, closes the valve 28 and discontinues the flow of oxygen. As this cycle takes place, the expiratory valve also goes through a cycle due to the operation of the valve member 78. This occurs in the following manner: When the parts reach the position shown in Fig. 6 and oxygen commences to be delivered to the chamber 34, it is also delivered under pressure to the line 37, the opening to this line being so positioned that a positive pressure is applied on the line 37 and is effective to operate diaphragm 74 which engages the plunger 76 and moves valve 78 against its seat. When the oxygen delivery flow to the delivery passageway 32 is interrupted, this cycle is reversed, the passageway 32 is open to atmosphere and the spring 77 is permitted to open the valve as far as permitted by the setting of the screw 84. We have found that the pressure required to operate the switch mechanism may be at an absolute minimum. In the operation of a device constructed in accordance with the present invention, the effort on inspiration required to move the diaphragm 18 downwardly sufficiently to trip the valve control mechanism is so slight as hardly to be noticeable. It may readily be controlled to be not more than ½ inch of negative pressure. Similarly, the return movement of the diaphragm takes place with not more than approximately ½ inch of positive pressure in the delivery line so that for all practical purposes there is merely a flow of oxygen at ambient pressures.

We postulated feeding of pure oxygen but it is to be understood that at intermediate pressures, say 10,000 to 15,000 feet, it is desirable at times to make available a mixture of air and oxygen and this may be done with the apparatus of our invention in several different ways which have not here been described because they are not of importance in connection with the present invention. The mixing device may be incorporated as part of the regulator or may be outside of the regulator, depending upon several factors which need not be discussed here. We merely wish to point out that the apparatus of the present invention is not limited to the administration of pure oxygen. Those skilled in the art will understand also that the mask C may be applied in position at lower altitudes and an airman may continue to perform his duties with the mask in position, the tube 92 being disconnected from the expiratory valve and the airman merely breathing ordinary atmosphere at low altitude pressure. This may be necessary or desirable because of the utilization of masks with microphone or other equipment and it is obvious that the system of our invention adapts itself to any of these needs. It is not necessary to employ separate masks or separate devices but the same mask may be employed throughout a flight.

Let us assume now that it is desirable to operate the equipment in such a way as to deliver oxygen under pressure. An aircraft may be required to operate above 38,000 feet, for example, at which elevation even pure oxygen at ambient pressure will not prevent anoxia. The subject now grasps the control arm 71 and moves it to proper position along the scale 72. If the scale is calibrated in altitude he may, for example, move it to 38,000 feet (or meters) or it may be calibrated in some other value but, in any event, it represents an increase in oxygen pressure in the delivery line at a figure above ambient pressure. By this operation, he urges the spring 68 downwardly so that before the diaphragm 18 can be moved upwardly a sufficient distance to trip the valve control mechanism, the spring 68 must be partially compressed. The extent to which the spring 68 must be compressed determines the pressure above ambient pressure which must be developed in the chamber 34 before tripping of the valve mechanism. The device now operates in exactly the same manner described hereinabove with the exception that oxygen is positively forced into the lungs of the subject instead of merely flowing to him in response to his action in inhaling. When the subject's lungs have been filled with oxygen or he resists further inhalation, pressure will increase slightly in the chamber 34 (exactly as in the case when the device functioned merely as an ambient pressure demand regulator) and the cycle is reversed, the expiratory valve open, and the subject is free to exhale normally. He can control the peak pressure against which he exhales by adjusting the expiratory orifice. When, now, he has exhaled and the pressure has been released in the delivery line and in the chamber 34, the mechanism remains at rest and there is no flow of oxygen until further inspiratory demand by the subject. The diaphragm will have dropped to a lower position so that it entirely clears the spring 68 and the spring is no longer a factor in the operation of the device. He now makes a slight inspiration, a slight negative pressure is developed and the cycle repeats itself in accordance with his demand.

If, for any reason, it is desirable to operate the system of our invention without requiring a positive demand on the part of the subject before the tripping of the valve mechanism and the delivery of oxygen to the delivery line, this is accomplished readily by adjusting the screw 62 as by throwing the arm 63 against the stop 64. The screw thread 62 may be calibrated to add the equivalent of one inch to the tension of the spring 56 so that now the spring 56 just has enough tension to return the valve mechanism with the assistance of diaphragm action due to negative pressure in the chamber 34. The cycle now occurs automatically. The oxygen is delivered at whatever pressure may be determined by the position of the control arm 71 and continues to flow until the predetermined peak pressure is reached in the chamber 34. At this point, the valve mechanism is tripped and the delivery of oxygen is discontinued. The expiratory valve also opens and the subject can exhale. In the event the subject has lost consciousness, some one associated with him can readily adjust the position of the arm 63 and the apparatus will then operate on a resuscitator principle. The subject's lungs will be filled with oxygen under pressure, when the peak pressure is attained the expiratory valve will be open and muscle tonus is adequate to cause expiration. The rate of expiration is, of course, controlled again by the setting of the expiratory valve. When the pressure in the line has dropped down to the point where the diaphragm and valve mechanism may be returned to lowermost position, assisted by the spring 56, the valve mechanism is again tripped, oxygen delivered to the delivery passageway 32 and the cycle again initiated. Probably the utility of the automatic feature of our invention will be greatest when used in other locations than in aircraft such as in the treatment of pulmonary edema caused by poison gas or the like. Apparently, however, the inclusion of this feature in apparatus intended for aircraft work may be of great advantage, particularly in the saving of life of any crew member taken seriously ill or wounded at high altitudes.

Most of the features of our present invention will be apparent to those skilled in the art from the above description. We wish to point out, however, that in addition to the adjustments which may be made in mechanism constructed in accordance with the present invention, the usual adjustments and controls common to the art of oxygen therapy or oxygen administration can also be used. We pointed out that oxygen might be delivered to the regulator at approximately eight pounds of pressure. Any usual means for maintaining this pressure can be employed. It may be found, however, that a small subject may, at eight pounds pressure, receive somewhat too much oxygen when the device is operated on the demand principle at ambient pressures. Should this be found to be the case, it is only necessary to cut the incoming pressure down slightly, say to five or six pounds per square inch, by valve means always provided with equipment customarily furnished with oxygen containers and regulators. The device of the present invention may be made relatively small and light for use in an airplane with the separate expiratory valve in the manner suggested or it may be embodied in other forms adapted for an entirely different type of use. The expiratory valve may, for example, be included in the same housing as the regulator or may be installed directly in the mask. In any case, the features of the expiratory valve may be retained including the ability to control the mean pressure and maintain a high mean pressure over a relatively long period of time, particularly when operating on the pressure demand or automatic principle.

We have referred previously to the shape and position of the plunger 38, and the fact that on first demand there may be a surge of oxygen so as to supply the immediate needs of the subject. It should be noticed that if the subject should at any time inhale sharply and deeply when the device is being operated on the demand principle, there will be another surge of oxygen because the diaphragm will be drawn down slightly. This is merely illustrative of the many ways in which the device of our invention will meet the needs of a subject under varying conditions. Further exemplification of the functioning of the system of the present invention may be had from a consideration of the copending application of Albert E. McKee, Serial No. 530,968, filed April 14, 1944. Reference should be made particularly to the explanatory curves and explanation thereof forming a part of such copending application.

It has been suggested that aneroids be employed to control certain adjustments on oxygen regulators, and it is understood that most, if not all, of the controls referred to hereinabove as being employed as part of, or in conjunction with, our invention, may be operated, if desired, by suitable aneroid mechanism.

Our invention may take various forms and the scope thereof is defined by the claims.

What we claim as new and desire to protect by Letters Patent of the United States is:

1. In a valve mechanism for an oxygen administration system, an outlet side thereof, valve means controlling flow of oxygen from a source under pressure to said outlet side, a diaphragm for controlling said valve means, said diaphragm operable on demand for oxygen to cause a flow thereof substantially at ambient pressure through said valve means and discontinuance of flow when inhalation ceases, manually controlled means for loading said diaphragm whereby to cause the oxygen flow to discontinue only when a peak pressure is attained above ambient pressure, said valve means including an over center switch responsive to the position of said diaphragm, said switch operating a valve for admitting oxygen to a chamber adjacent said diaphragm, and means to permit more rapid flow to said diaphragm chamber when said valve is first opened than during remaining portions of the inspiration cycle.

2. In a regulator of the class described, an oxygen delivery line, a valve operable to control the delivery of oxygen from a pressure source to said line, a booster diaphragm operable to control the position of said valve, a diaphragm mechanism responsive to pressure in the said delivery line, valve mechanism responsive to operation of the said diaphragm mechanism, said valve mechanism controlling flow of high pressure oxygen from said pressure source to said booster diaphragm, whereby to operate the same and actuate the first mentioned valve, and means to control both the high and low pressure points in said line at which said diaphragm mechanism operates, said last mentioned means being controllable to require either a positive or negative pressure in the said line to initiate oxygen flow after it has been interrupted.

3. In an oxygen feeding system, a mask, a valve device having a housing with one chamber in communication with the mask and one chamber communicating with atmosphere, a pressure responsive device between the two chambers, an expiratory valve having an orifice communicating with said mask, a pressure responsive device controlling said expiratory valve to close the same, said valve being biased for opening movement thereof, a line supplying oxygen under pressure, a valve in said line controlling flow of oxygen to said mask and said pressure responsive device for said expiratory valve, over center switch means operated by the first-mentioned pressure responsive device when the pressure in the mask reaches a predetermined peak pressure, to interrupt oxygen flow to said chamber and mask, and adjustable spring means biasing said pressure responsive means toward said first-mentioned chamber, said means being just insufficient to operate said oxygen valve means and deliver oxygen when the pressure therein approaches atmospheric pressure, but responding to move said pressure responsive means and operate said valve when a slight negative pressure is established, and means for additionally loading said pressure responsive device to cause return movement and operation of said valve to admit oxygen when the pressure in the mask is lowered substantially to atmospheric.

4. In an oxygen administration system, a regulator including a casing forming a low pressure oxygen chamber and a high pressure oxygen chamber, a diaphragm having one side in contact with said low pressure chamber, an overcenter switch operated by movement of said diaphragm, a control valve operated by said switch, a second diaphragm having a chamber on one side thereof, a main valve operated by said second diaphragm, a passageway leading from said high pressure chamber to said diaphragm chamber, said passageway being opened by said control valve, a second passageway between said high pressure chamber and low pressure chamber controlled by the said main valve, the relationship of the parts being such that movement of the first mentioned diaphragm in response to a minimum and maximum pressure will close or open said control valve and the second mentioned diaphragm will thereby close or open the said main valve to cut off the flow of oxygen, or deliver oxygen to said low pressure chamber, an expiratory valve spring pressed in one direction, pressure responsive mechanism for moving the same against said spring pressure, and a passageway leading from said main valve passageway to said pressure responsive mechanism when the oxygen is flowing from the said high pressure chamber to the said low pressure chamber.

5. In an oxygen administration system, a regulator including a casing forming a low pressure oxygen chamber and a high pressure oxygen chamber, a diaphragm having one side in contact with said low pressure chamber, an overcenter switch operated by movement of said diaphragm, a control valve operated by said switch, a second diaphragm having a chamber on one side thereof, a main valve operated by said second diaphragm, a passageway leading from said high pressure chamber to said diaphragm chamber, said passageway being opened by said control valve, a second passageway between said high pressure chamber and low pressure chamber controlled by the said main valve, the relationship of the parts being such that movement of the first mentioned diaphragm in response to a minimum and maximum pressure will close or open said control valve and the second mentioned diaphragm will thereby close or open the said main valve to cut off the flow of oxygen, or deliver oxygen to said low pressure chamber, an expiratory valve normally biased in one direction, pressure responsive mechanism for moving said valve against said normal bias, and means for delivering oxygen from said high pressure chamber to said pressure responsive mechanism, when said main valve is opened to deliver oxygen to said low pressure chamber.

6. In an oxygen administration system, a regulator including a casing forming a low pressure oxygen chamber and a high pressure oxygen chamber, a diaphragm having one side in contact with said low pressure chamber, an overcenter switch operated by movement of said diaphragm, a control valve operated by said switch, a second diaphragm having a chamber on one side thereof, a main valve operated by said second diaphragm, a passageway leading from said high pressure chamber to said diaphragm chamber, said passageway being opened by said control valve, a second passageway between said high pressure chamber and low pressure chamber controlled by the said main valve, the relationship of the parts being such that movement of the first mentioned diaphragm in response to a minimum and maximum pressure will close or open said control valve and the second mentioned diaphragm will thereby close or open the said main valve to cut off the flow of oxygen, or deliver oxygen to said low pressure chamber, a normally open expiratory valve, pressure responsive mechanism for closing the same, and means for delivering oxygen from said high pressure chamber to said pressure responsive mechanism when the oxygen is flowing from the said high pressure chamber to the said low pressure chamber.

7. In a regulator of the class described, an oxygen delivery line, a valve operable to control the delivery of oxygen from a pressure source to said line, a booster mechanism operable to control the position of said valve, mechanism responsive to pressure in the said delivery line, valve mechanism responsive to operation of the said pressure responsive mechanism, said valve mechanism controlling flow of high pressure oxygen from said pressure source to said booster mechanism, whereby to operate the same and actuate the first mentioned valve, and means to control both the high and low pressure points in said line at which said pressure responsive mechanism operates, said last mentioned means being controllable to require either a positive or negative pressure in the said line to initiate oxygen flow after it has been interrupted.

8. In a valve device for an oxygen feeding system of the character described, an outlet side thereof, a valve operable to control delivery of oxygen from a pressure source to said outlet side, a diaphragm mechanism responsive to pressure at said outlet side, mechanism including a booster diaphragm actuated by oxygen delivered directly from said pressure source responsive to operation of said diaphragm mechanism to control movement of said first mentioned valve, means for actuating said diaphragm mechanism and opening said first-mentioned valve on establishment of a negative pressure at said outlet side, and means for moving said diaphragm mechanism in a reverse direction to close said valve when a predetermined peak positive pressure is attained at said outlet side, whereby to discontinue flow of oxygen to said booster diaphragm, the said mechanism functioning at slight pressure differential at said outlet side.

9. In a valve device for an oxygen feeding system of the character described, an outlet side thereof, a valve operable to control delivery of oxygen from a pressure source to said outlet side, a diaphragm mechanism responsive to pressure at said outlet side, means for controlling the load on said diaphragm mechanism whereby to control the pressure at said outlet side to which said mechanism is responsive, mechanism including a booster diaphragm actuated by oxygen delivered directly from said pressure source responsive to operation of said diaphragm mechanism to control movement of said first mentioned valve, means for actuating said diaphragm mechanism and opening said first-mentioned valve on establishment of a negative pressure at said outlet side, and means for moving said diaphragm mechanism in a reverse direction to close said valve when a predetermined peak positive pressure is attained at said outlet side, whereby to discontinue flow of oxygen to said booster diaphragm, the said mechanism functioning at slight pressure differential at said outlet side, regardless of the peak pressure at said outlet side.

10. In a valve device for an oxygen feeding system of the character described, an outlet side thereof, a valve operable to control delivery of oxygen from a pressure source to said outlet side, a diaphragm mechanism responsive to pressure at said outlet side, mechanism responsive to operation of said diaphragm mechanism but powered by oxygen pressure from said pressure source, for controlling the movement of said first mentioned valve, means for actuating said diaphragm mechanism and opening said first-mentioned valve on establishment of a negative pressure at said outlet side, means for moving said diaphragm mechanism in a reverse direction to close said valve when predetermined peak positive pressure is attained at said outlet side, and means for differentially loading said diaphragm to control the peak pressure at said outlet side.

11. In a valve device for an oxygen feeding system of the character described, an outlet side thereof, a valve operable to control delivery of oxygen from a pressure source to said outlet side, a diaphragm mechanism responsive to pressure at said outlet side, mechanism responsive to operation of said diaphragm mechanism but powered by oxygen pressure from said pressure source, for controlling the movement of said first mentioned valve, means for actuating said diaphragm mechanism and opening said first-mentioned valve on establishment of a negative pressure at said outlet side, means for moving said diaphragm mechanism in a reverse direction to close said valve when predetermined peak positive pressure is attained at said outlet side, and means for differentially loading said diaphragm to control the peak pressure at said outlet side, and means for indicating to a user the setting of said differential loading means and the peak pressure resulting therefrom.

12. In an oxygen flow regulator, a casing having a diaphragm with one side thereof exposed to atmosphere, a low pressure chamber in the casing having one side thereof defined by said diaphragm, a high pressure oxygen chamber, a valve controlling flow from the high pressure to the low pressure chamber, a toggle over center switch mechanism outside the low pressure chamber and operably connected to said diaphragm, said mechanism being biased to operate and open said control valve when a slight negative pressure is developed in said low pressure chamber, and to operate in an opposite direction when a peak positive pressure is developed in said low pressure chamber, a diaphragm loading spring outside said low pressure chamber, said diaphragm loading spring being normally out of contact with the diaphragm, and means for moving said loading spring a controlled distance toward the diaphragm to increase the said peak pressure at which said toggle mechanism operates to discontinue oxygen flow.

13. In an oxygen flow regulator, a casing having a diaphragm with one side thereof exposed to atmosphere, a low pressure chamber in the casing having one side thereof defined by said diaphragm, a high pressure oxygen chamber, a valve controlling flow from the high pressure to the low pressure chamber, a toggle over center switch mechanism outside the low pressure chamber and operably connected to said diaphragm, said mechanism being biased to operate and open said control valve when a slight negative pressure is developed in said low pressure chamber, and to operate in an opposite direction when a peak positive pressure is developed in said low pressure chamber, a diaphragm loading spring outside said low pressure chamber, said diaphragm loading spring being normally out of contact with the diaphragm, and means for moving said loading spring a controlled distance toward the diaphragm to increase the said peak pressure at which said toggle mechanism operates to discontinue oxygen flow, said moving means being incapable of adding to the load of the diaphragm sufficiently to operate the toggle mechanism when a positive pressure exists in said low pressure chamber.

14. In an oxygen flow regulator, a casing having a diaphragm with one side thereof exposed to atmosphere, a low pressure chamber in the casing having one side thereof defined by said diaphragm, a high pressure oxygen chamber, a valve controlling flow from the high pressure to the low pressure chamber, a toggle over center switch mechanism outside the low pressure chamber and operably connected to said diaphragm, said mechanism being biased to operate and open said control valve when a slight negative pressure is developed in said low pressure chamber, and to operate in an opposite direction when a peak positive pressure is developed in said low pressure chamber, a diaphragm loading spring outside said low pressure chamber, said diaphragm loading spring being normally out of contact with the diaphragm, and means for moving said loading spring a controlled distance toward the diaphragm to increase the said peak pressure at which said toggle mechanism operates to discontinue oxygen flow, said moving means being incapable of adding to the load of the diaphragm sufficiently to operate the toggle mechanism when a positive pressure exists in said low pressure chamber, and additional means to load the diaphragm whereby to operate the toggle mechanism and initiate oxygen flow when a slight positive pressure, below said peak pressure, exists in said low pressure chamber.

ALBERT E. McKEE.
JAMES D. ELSOM.

REFERENCES CITED

The following references are of record in the file of this patent:

UNITED STATES PATENTS

| Number | Name | Date |
|---|---|---|
| 744,297 | Cook | Nov. 17, 1903 |
| 1,021,762 | Cross | Apr. 2, 1912 |
| 1,489,811 | Beggs | Apr. 8, 1924 |
| 1,814,530 | Spence | July 14, 1931 |
| 2,063,043 | McKesson | Dec. 8, 1936 |
| 2,121,311 | Anderson et al. | June 21, 1938 |
| 2,138,845 | Erickson | Dec. 6, 1938 |
| 2,185,713 | Spence | Jan. 2, 1940 |
| 2,223,570 | McMillin | Dec. 3, 1940 |
| 2,268,172 | Sinnett | Dec. 30, 1941 |
| 2,269,500 | Wildhack | Jan. 13, 1942 |
| 2,269,904 | Erickson | Jan. 13, 1942 |
| 2,273,111 | Kindl | Feb. 17, 1942 |
| 2,288,436 | Cahan | June 30, 1942 |
| 2,318,827 | Yant | May 11, 1943 |
| 2,328,214 | Holmes | Aug. 31, 1943 |
| 2,376,348 | Fox | May 22, 1945 |

FOREIGN PATENTS

| Number | Country | Date |
|---|---|---|
| 439,183 | Great Britain | Dec. 2, 1935 |
| 645,056 | Germany | May 20, 1937 |